US011766316B2

(12) United States Patent
DiLauri et al.

(10) Patent No.: US 11,766,316 B2
(45) Date of Patent: Sep. 26, 2023

(54) PIN ENGAGEMENT DEVICE RELATING TO GUIDED PLACEMENT IN A SURGICAL PROCEDURE

(71) Applicants: Greggory Joseph DiLauri, Boonton, NJ (US); Brandon Scott Dickerman, Mansfield, MA (US)

(72) Inventors: Greggory Joseph DiLauri, Boonton, NJ (US); Brandon Scott Dickerman, Mansfield, MA (US)

(*) Notice: Subject to any disclaimer, the term of this patent is extended or adjusted under 35 U.S.C. 154(b) by 43 days.

(21) Appl. No.: 17/349,302

(22) Filed: Jun. 16, 2021

(65) Prior Publication Data
US 2021/0393379 A1 Dec. 23, 2021

Related U.S. Application Data

(60) Provisional application No. 63/041,377, filed on Jun. 19, 2020.

(51) Int. Cl.
*A61C 8/00* (2006.01)
(52) U.S. Cl.
CPC .......... *A61C 8/0089* (2013.01); *A61C 8/0028* (2013.01)
(58) Field of Classification Search
CPC ..... A61C 8/0089; A61C 8/0028; A61C 1/084; A61C 3/10; A61C 1/08; A61C 3/14; A61C 1/082; A61C 3/16; A61B 17/28; A61B 17/282; A61B 2018/00473; B25B 7/02; B25B 7/00; B25B 5/00; B25B 5/14; B25B 5/16; B25B 5/163; B25B 31/00; B25B 3/00
See application file for complete search history.

(56) References Cited

U.S. PATENT DOCUMENTS

| 1,585,903 | A | * | 5/1926 | McIntyre | .................. B25F 1/00 |
| | | | | | 7/129 |
| 1,676,042 | A | * | 7/1928 | Ogden | ..................... A61C 3/14 |
| | | | | | 433/145 |
| 1,680,205 | A | * | 8/1928 | Cline | ........................ B25B 7/02 |
| | | | | | 81/426 |

(Continued)

FOREIGN PATENT DOCUMENTS

EP 0307491 A1 6/1993

OTHER PUBLICATIONS

Cosda Manufacturing Company. Multi-Directional Pliers (Patented). https://www.youtube.com/watch?v=3rLhQrZcWzM. May 2016. 0-38s. (Year: 2016).*

(Continued)

*Primary Examiner* — Heidi M Eide
*Assistant Examiner* — Lina Faraj
(74) *Attorney, Agent, or Firm* — Lowenstein Sandler LLP

(57) ABSTRACT

A device configured to engage and hold a structure (e.g., pin) to be inserted in a hole or opening of a target structure (e.g., a surgical guide) during a surgical procedure (e.g. a dental implant procedure). The device can include a first arm having a first arm end portion with a first groove. The device includes a second arm coupled to the first arm, the second arm including a second arm end portion with a second groove. The device can be transitioned between an open position and a closed position, In the closed position, the first groove of the first end portion and the second groove of the second end portion form an enclosure to securely engage at least a portion of a pin.

17 Claims, 10 Drawing Sheets

(56) References Cited

U.S. PATENT DOCUMENTS

| | | | | |
|---|---|---|---|---|
| 2,600,803 A * | 6/1952 | Prather | A61C 3/14 | 433/146 |
| 2,842,997 A * | 7/1958 | Wentling | B25B 7/02 | 43/53.5 |
| 3,369,550 A * | 2/1968 | Armao | F25B 21/02 | D24/143 |
| 4,135,506 A | 1/1979 | Ulrich | | |
| 4,189,839 A * | 2/1980 | Manuel | A61C 7/04 | D8/57 |
| 4,206,663 A * | 6/1980 | Pace | B25B 7/02 | 7/125 |
| 4,286,598 A * | 9/1981 | Kapitanov | A61B 17/282 | 606/207 |
| 4,752,220 A * | 6/1988 | Dietrich | A61D 5/00 | 433/145 |
| 5,120,221 A | 6/1992 | Orenstein et al. | | |
| 5,391,181 A * | 2/1995 | Johnson | A61B 17/282 | 81/424.5 |
| 5,562,447 A * | 10/1996 | Moy | A61C 8/0089 | 606/100 |
| 5,624,454 A * | 4/1997 | Palti | A61B 17/282 | 606/151 |
| 6,934,991 B2 * | 8/2005 | Kinkade | B25D 1/045 | 7/137 |
| 8,152,834 B2 * | 4/2012 | McGarity | A61B 17/2816 | 606/205 |
| 2003/0110900 A1 * | 6/2003 | Chen | B25C 3/008 | 81/44 |
| 2004/0157189 A1 * | 8/2004 | Bell | A61C 3/10 | 433/159 |
| 2006/0190033 A1 * | 8/2006 | Molloy | A61B 17/282 | 606/205 |
| 2012/0058448 A1 * | 3/2012 | Ang | A61C 8/005 | 433/173 |
| 2018/0103995 A1 * | 4/2018 | Ding | A61B 17/2833 | |

OTHER PUBLICATIONS

PCT Notification of Transmittal of the International Search Report and the Written Opinion of the International Searching Authority for PCT Application No. PCT/US2021/37884, dated Sep. 23, 2021, 15 pages.

\* cited by examiner

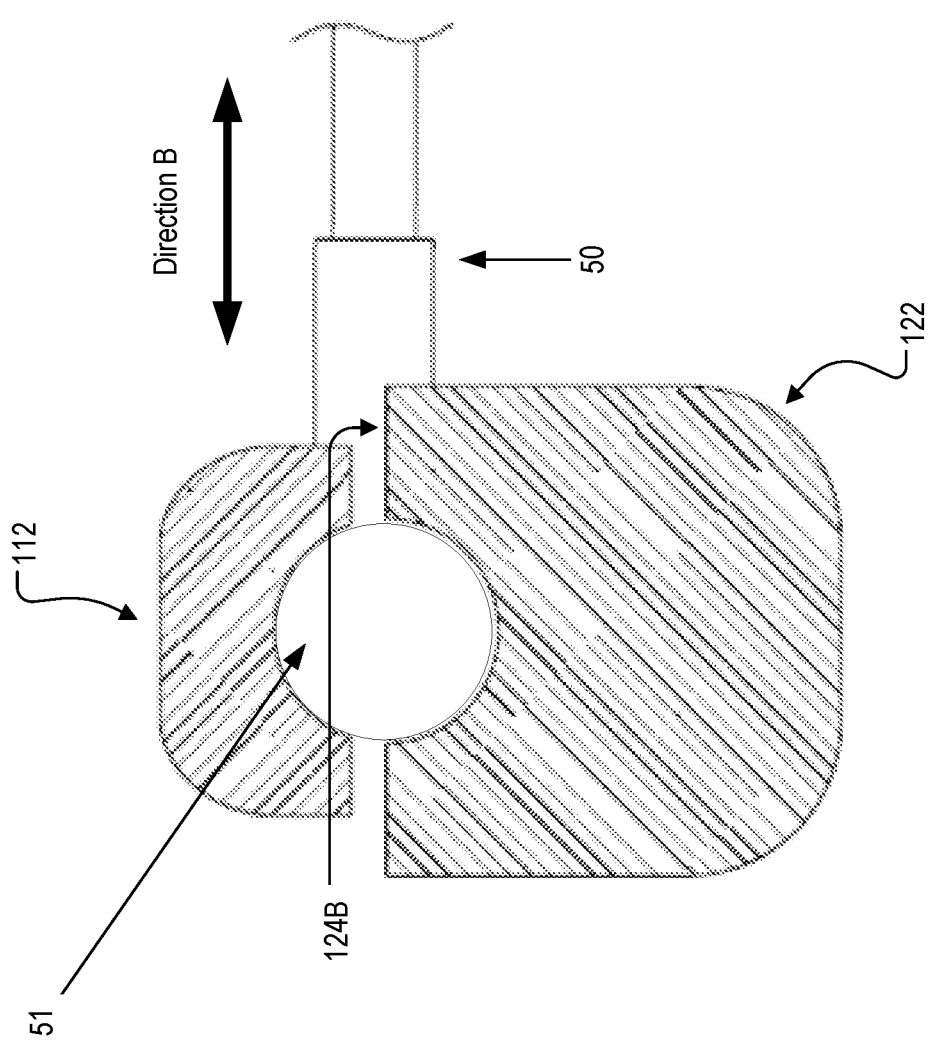

US 11,766,316 B2

PIN ENGAGEMENT DEVICE RELATING TO GUIDED PLACEMENT IN A SURGICAL PROCEDURE

CROSS-REFERENCE TO RELATED APPLICATION

This application claims the benefit of U.S. Provisional Application No. 63/041,377, titled "Pin Holder for Guided Surgery", filed Jun. 19, 2020, the entire disclosure of which is incorporated herein by reference.

TECHNICAL FIELD

Embodiments of the disclosure relate generally to surgical procedures, and more specifically, relate to a device configured to engage and hold at least a portion of a pin for guided placement during a surgical procedure.

BACKGROUND

A typical guided dental implant surgery involves the use of a surgical guide to assist a surgeon in placement and alignment of the dental implant in a desired location in the patient's mouth. The surgical guide may include one or more holes or bores in which a pin is inserted to secure the dental implant guide in place. Typically, a surgeon uses his or her fingers or a conventional hemostat to hold the pin during insertion into the surgical guide. However, the use of the surgeon's fingers or a conventional hemostat both fail to provide secure engagement of the pin, which can result in the pin slipping and falling into the operative field. Furthermore, the use of finger to apply a force to a head of the pin that is sufficient to insert the pin into the surgical guide causes significant pressure, fatigue, and discomfort to the surgeon's finger.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

FIG. 8 is a cross-sectional view of portion of the device of FIG. 7 in a closed position and in engagement with a pin, in accordance with one or more implementations.

DETAILED DESCRIPTION

The present disclosure relates to a device (e.g., a medical device) to securely engage and hold a structure (e.g., pin) to be inserted in a hole or opening of a target work piece (e.g., a surgical guide) during a surgical procedure (e.g. a dental implant procedure). The device (also referred to as a "pin engagement device") is configured to include a first arm and a second arm pivotally connected to one another to enable transition of the pin engagement device between an open position and a closed position. In the closed position, a first end portion of the first arm and a second end portion of the second arm cooperate to securely engage a head portion of a pin. Advantageously, the configuration of the first end of the first arm and the second end of the second arm form an enclosure to at least partially surround and secure the head portion of the pin in engagement within the device. With the head portion of the pin securely engaged by the device in the closed position, the pin can be moved and positioned for insertion into a hole or opening of a target work piece (e.g., a surgical guide).

The first end portion of the first arm includes a first groove configured to align with a second groove of the second end of the second arm to form the enclosure to secure the head portion of the pin in place within the device when in the closed position. In operation, the pin engagement device in the open position is moved into contact with a head portion of the pin. In an embodiment, during operation of the pin engagement device, the second groove of the second end portion of the second arm head is moved into alignment with the head portion of the pin. In an embodiment, the head portion of the pin is aligned and situated at least partially within the second groove. In an embodiment, the first groove of the first arm portion is shaped and sized to receive a head portion of the pin. In an embodiment the second groove is spherically-shaped (e.g., U-shaped) to enable the head portion of the pin to sit within the second groove. In an embodiment, the pin engagement device if further operated (e.g., using the hand grips) to actuate the pivot and bring the first arm and the second arm into the closed position such that the head portion of the pin is securely engaged within the first groove of the first end portion of the first arm and the second groove of the second end portion of the second arm.

Figure 3:
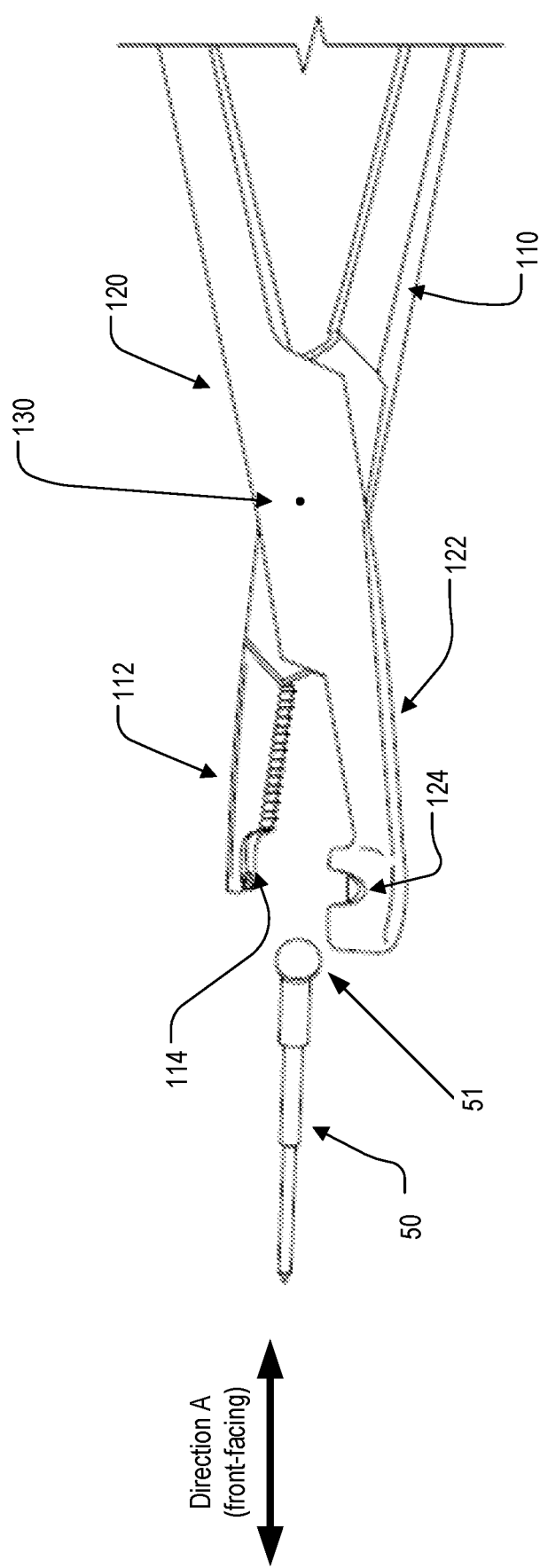
FIG. 3 illustrates a perspective side view of a portion of a device in an open position arranged for front-facing engagement with a pin, in accordance with one or more implementations.
Figure 6:
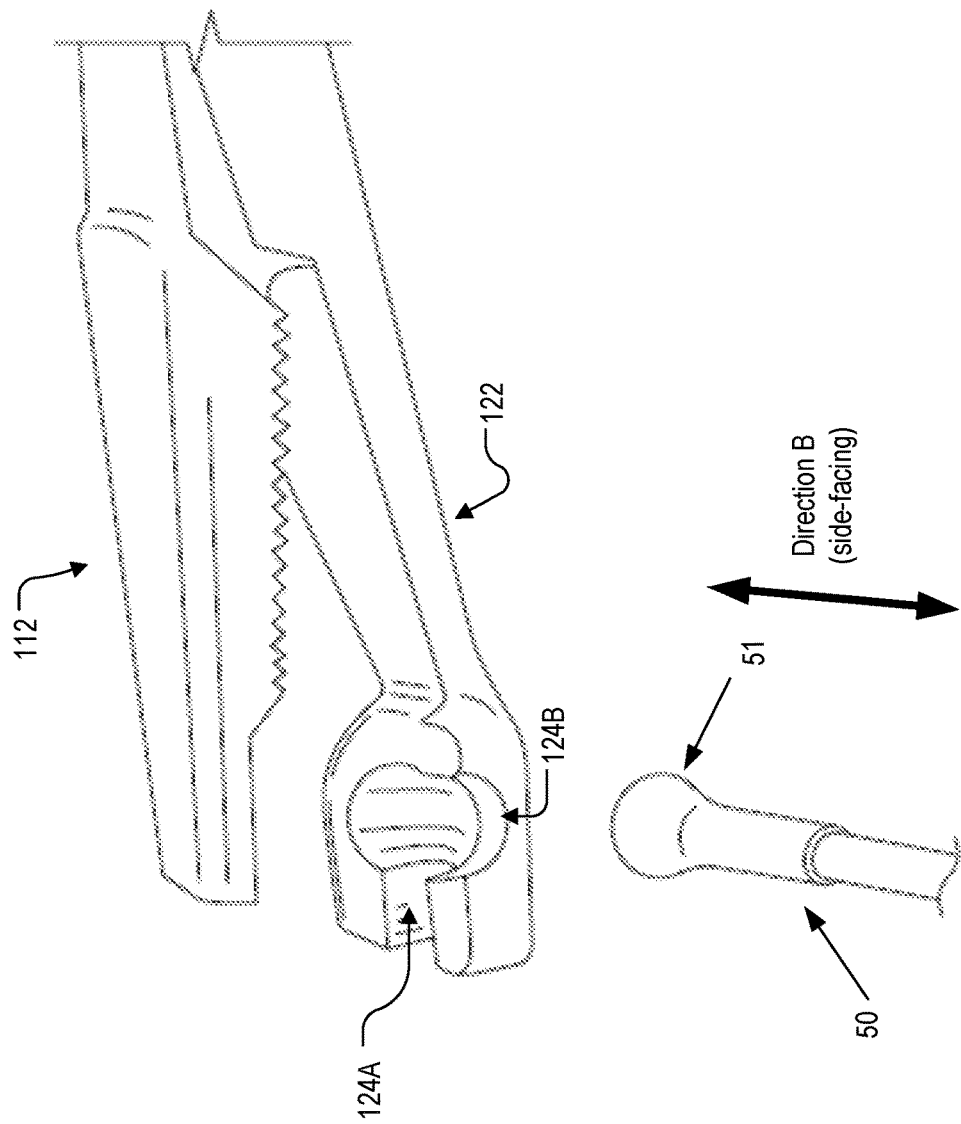
FIG. 6 illustrates a perspective side view of a portion of a device in an open position arranged for side-facing engagement with a pin, in accordance with one or more implementations.

In an embodiment, the second end portion of the second arm may include a first slot aligned with a top surface of the second end portion. The first slot enables engagement of pin with the device from a first direction (e.g., from a front end of the device as shown in FIG. 3). In an embodiment, the second end portion of the second arm may include a second slot aligned with a side surface of the second end portion. The first slot enables engagement of pin with the device from a second direction (e.g., from a perpendicular direction relative to a side edge of the device as shown in FIG. 6). In an embodiment, the second slot enables the engagement of the head portion of the pin such that the pin extends perpendicularly relative to the first arm and the second arm in the closed position. Advantageously, in an embodiment where the device includes both the first slot and the second slot, the device can be oriented in multiple different positions within the surgical field during operation of the device to insert the pin within the surgical guide.

Figure 1:
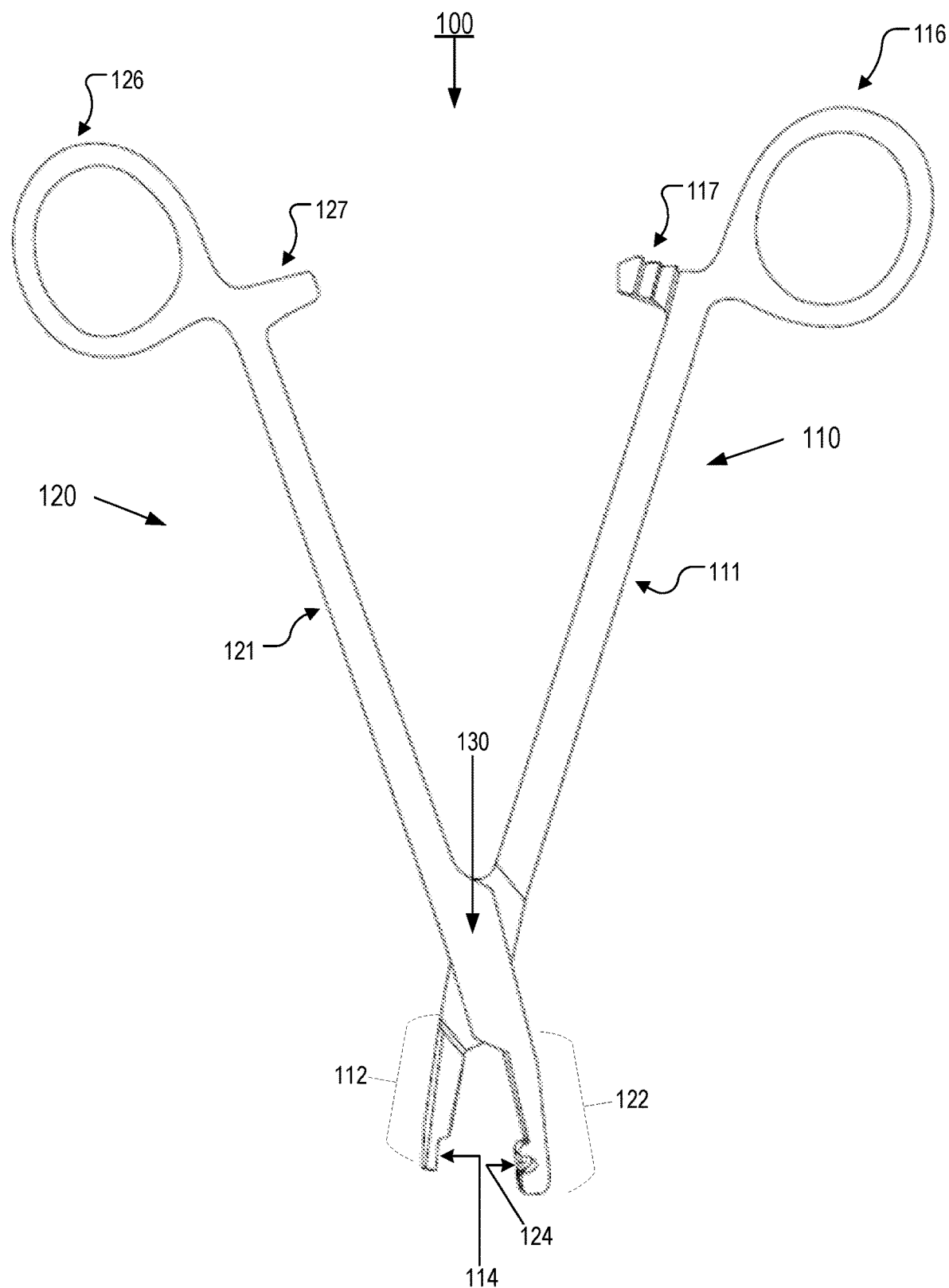
FIG. 1 shows a top view of an example device in an open position, the device to enable engagement with at least a portion of a pin for placement of the pin in a guided surgical procedure, in accordance with one or more implementations.

FIG. 1 illustrates an example pin engagement device 100 (herein "device" 100) in an open position, according to embodiments of the present disclosure. As shown, the device 100 includes a first arm 110 pivotally coupled to a second arm 120. The first arm 110 includes a first intermediate portion 111, a first arm end portion 112 at a first end of the first arm 110 (e.g., arranged or positioned at a first end of the first intermediate portion 111) and a first handle portion 116 at a second end of the first arm 110 (e.g., arranged or positioned at a second end of the first intermediate portion 111). In an embodiment, the second arm 120 includes a second intermediate portion 121, a second arm end portion 122 at a first end of the second arm 120 (e.g., arranged or positioned at a first end of the second intermediate portion 121), and a second handle portion 126 at a second end of the second arm 120 (e.g., arranged or positioned at a second end of the second intermediate portion 121). In an embodiment, the first end and the second end are disposed at opposite ends of the device 100, as shown in FIG. 1. In operation, the first end of the device 100 (e.g., the first arm end portion 112 and the second arm end portion 122) is configured to engage with and secure a pin or other like structure for the controlled insertion of the pin into a hole or opening of a target structure or workpiece (e.g., a surgical guide for use in a surgical procedure such as a dental implant surgery). The second end of the device 100 is configured for interaction by an operator to hold and move the device 100 and provide an actuating force to transition the device 100 between the open position (as shown in FIG. 1) and the closed position (as shown in FIG. 2).

In an embodiment, the handle portions 116, 126 of the second end of the device 100 are configured to be held by an operator (e.g., a surgeon) during operation of the device 100. In an embodiment, the handle portions 116, 126 include ring-like structures configured to respectively receive a finger of the operator to enable the gripping and holding of the device 100 during handling and operation of the device 100 including the transition of the device 100 between the open position and the closed position.

Figure 2:
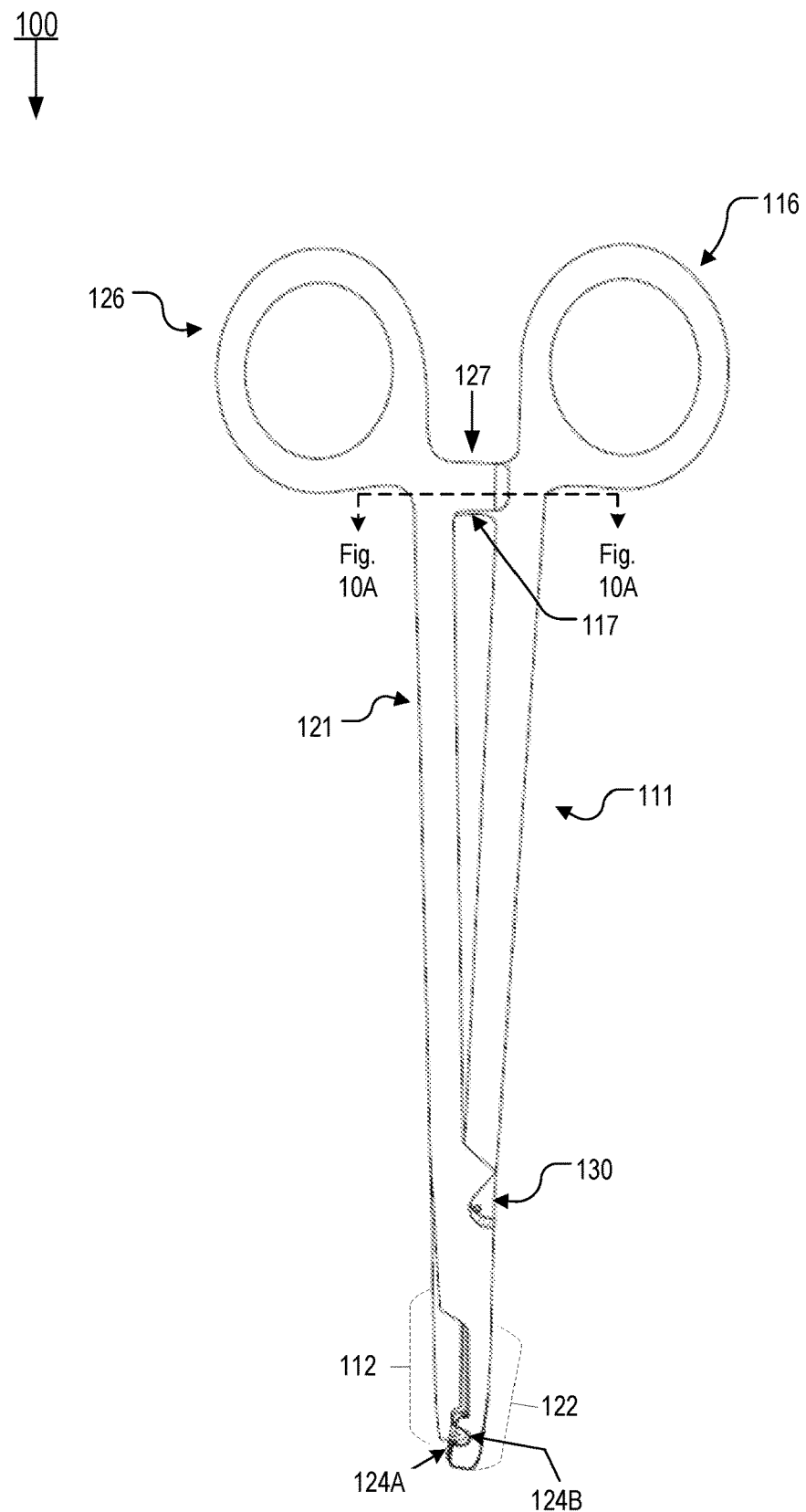
FIG. 2 shows a top view of an example device in a closed position, the device to enable engagement with at least a portion of a pin for placement of the pin in a guided surgical procedure, in accordance with one or more implementations.

FIG. 2 illustrates the device 100 in the closed position. In an embodiment, the first arm 110 includes a first arm locking portion 117 configured to engage with a second arm locking portion 127 of the second arm 120 to lock the device 100 in the closed position, as shown in FIG. 2. The first arm locking portion 117 can a first surface including a set of grooves (e.g., a serrated surface) configured to engage and mate with a corresponding set of grooves on a second surface of the second arm locking portion 127. In operation, the device 100 can be transitioned from the open position (as shown in FIG. 1) to the closed and locked position (as shown in FIG. 2) by an operator engaging with the handle portions 116, 126 and causing actuation of the first arm 110 and the second arm 120 to move the first arm locking portion 117 into engagement with the second arm locking portion 127.

In an embodiment, the serrated surfaces of the first arm locking portion 117 and the second arm locking portion 127 can include a series of teeth that cut deeper towards the tip end of the device (i.e., the first end) and become progressively shallower therefrom toward the handle end of the device (e.g., the second end). Thus, when the first arm 110 and the second arm 120 are moved toward each other the corresponding portions of the teeth initially engage, such that the progressive engagement of the several teeth with each other is achieved as the first arm 110 and the second arm 120 move toward the final clamping position.

In an embodiment, the first arm 110 includes the first intermediate portion 111 extending between the first arm end portion 112 and the first handle portion 116. In an embodiment, the second arm 120 includes the second intermediate portion 121 extending between the second arm end portion 122 and the second handle portion 126. In an embodiment, the first intermediate portion 111 and the second intermediate portion 121 include portions that are coupled to one another by a coupling 130 (e.g., a pivot pin or other structure enabling a pivot or rotation of the first arm 110 and the second arm 120 relative to one another). The coupling 130 couples the first arm 110 and the second arm 120 in an arrangement such that the first arm 110 and the second arm 120 rotate or pivot about the coupling 130 in response to a force to transition the device 100 between the open position (as shown in FIG. 1) and the closed position (as shown in FIG. 2).

In an embodiment, the first arm end portion 112 and the second arm end portion 122 form a jaw-like structure configured to transition a closed position to clamp and close around a head portion of a pin to securely hold the pin within the device 100, as shown in FIGS. 4, 5B, 7, 8, and 10.

FIG. 3 illustrates a portion of the device (e.g., device 100 of FIGS. 1 and 2) including the first end of the first arm 110 and the first end of the second arm 120 in the open position prior to engagement with a pin 50. As shown in FIG. 3, the first end of the device 100 (e.g., a front end of the device 100 opposite from the second end of the device 100 including the gripping portions 116, 126, as shown in FIGS. 1 and 2) can be aligned with the pin 50 in a first direction (herein referred to as "direction A"). In an embodiment, one or both of the device 100 or the pin 50 can be moved in direction A to situate a head portion 51 of the pin 50 between the first arm end portion 112 and the second arm end portion 122. In an embodiment, the first arm end portion 112 includes a first arm groove 114 (e.g., a slot or channel) and the second arm end portion 122 includes a second arm front-facing groove 124 aligned in direction A. In an embodiment, the first arm groove 114 and the second arm front-facing groove 124 are configured to form an enclosure around at least a portion of the pin 50 to securely hold the pin 50 in place when the device 100 is in the closed position.

Figure 4:
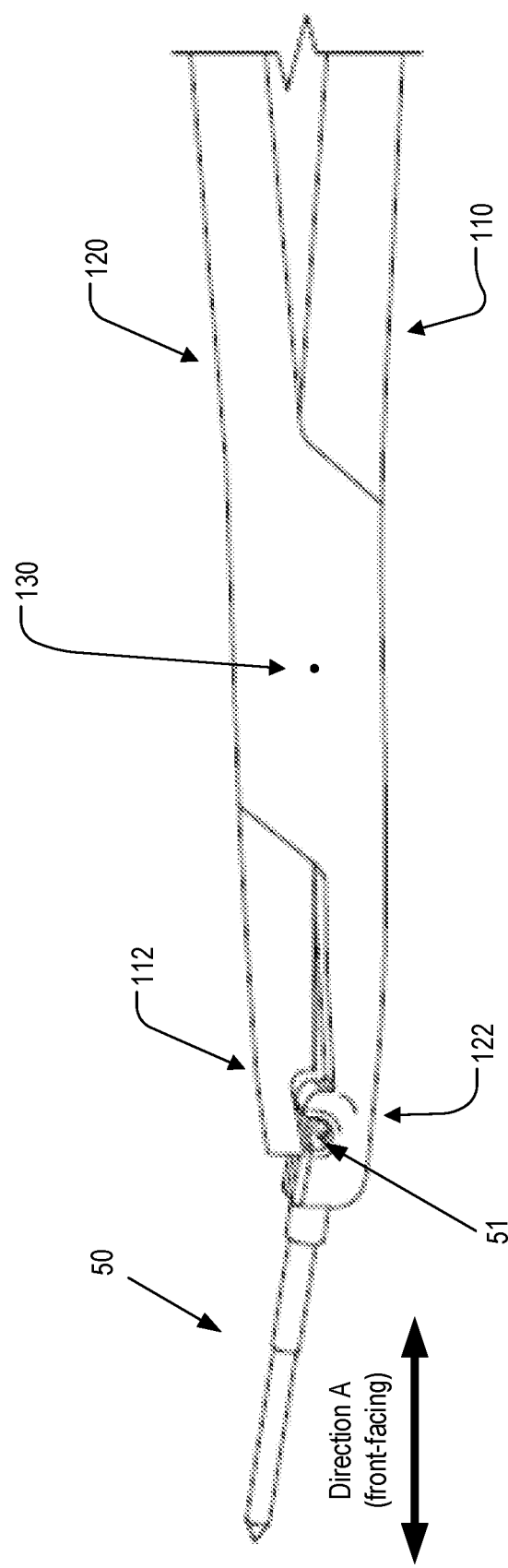
FIG. 4 illustrates a perspective side view of a portion of the device in FIG. 3 in a closed position in engagement with a pin in a first direction, in accordance with one or more implementations.
Figure 5:
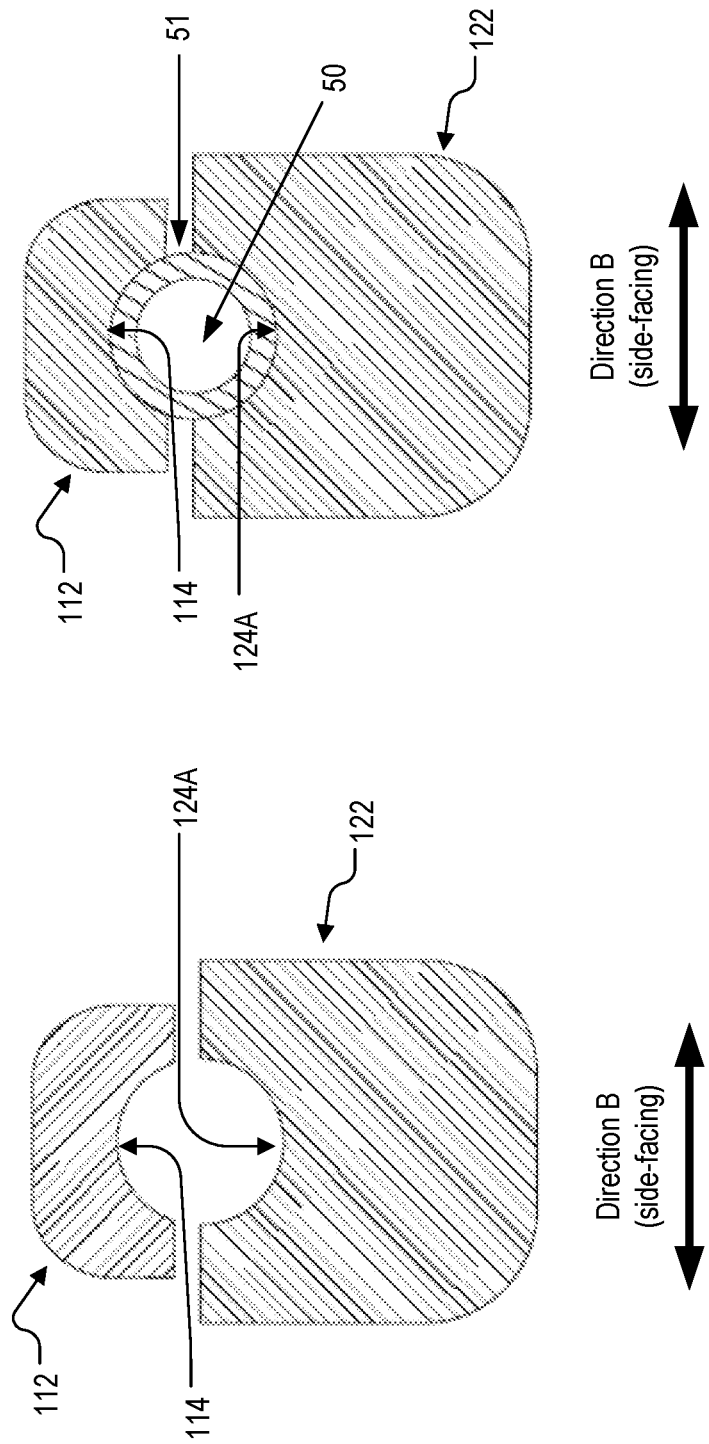
FIG. 5A illustrates a cross-sectional view of a portion of the device in FIG. 4 in the closed position, in accordance with one or more implementations.
FIG. 5B illustrates a cross-sectional view of a portion of the device in FIG. 4 in the closed position and in engagement with a pin, in accordance with one or more implementations.

As shown in FIG. 4, a portion of pin 50 (e.g., a stem portion) extends out from the device 100 in the first direction A when the head portion of the pin 50 is secured or clamped within the first arm end portion 112 and the second arm end portion 122 of the device 100 in the closed position. The portion of pin 50 extending in direction A can be controlled and inserted into a receiving element (e.g., a hole or bore) of a target structure.

FIG. 5A illustrates a cross-sectional view of a portion of the device shown in FIG. 4 when the device is in the closed position (without a pin enclosed). FIG. 5B illustrates a cross-sectional view of a portion of the device shown in FIG. 4 including the first arm end portion 112 and the second arm end portion 122 with the pin 50 enclosed therein with a portion of the pin 50 extending in direction A (e.g., a direction facing the front of the device (e.g., a front-facing direction) which is orthogonal to direction B as noted in FIGS. 5A and 5B), according to embodiments of the present disclosure.

As shown in FIGS. 5A and 5B, the first arm groove 114 and the second arm groove 124 are sized and shaped (e.g., U-shaped or curved portions) to at least partially surround or enclose at least a portion of the head portion 51 of the pin 50. In an embodiment, the respective curvatures and shapes of the grooves 114 and 124 enable a secure engagement of the head portion 51 of the pin 50 when the device 100 is in the closed position, as shown in FIG. 5B. In an embodiment, the second arm groove 124 includes a front recess portion 124A (shown, for example, in FIG. 5A and FIG. 9B) and a second recess portion 124B (shown, for example, in FIGS. 8, 9A, and 9B).

In an embodiment, the device 100 may be maintained in a locked position around the head portion 51 of the pin 50 by applying and maintaining a force using the handle portions 116, 126 of the second end of the device 100 or by engaging the first arm locking portion 117 and the second arm locking portion 127.

FIG. 5B illustrates a cross-sectional view of a portion of FIG. 5A including the first arm end portion 112 and the second arm end portion 122 with the pin 50 enclosed therein and extending in the second direction B, according to embodiments of the present disclosure. The first arm groove 114 and the second arm groove 124 are sized and shaped (e.g., U-shaped or curved portions) to at least partially surround or enclose at least a portion of the head portion of the pin 50. In an embodiment, the respective curvatures and shapes of the grooves 114 and 124 enable a secure engagement of the pin 50 when the device 100 is in the closed position. In an embodiment, the device 100 may be maintained in a locked position around the head portion of the pin 50 by applying and maintaining a force using the handle portions 116, 126 of the second end of the device 100 or by engaging the first arm locking portion 117 and the second arm locking portion 127.

In an embodiment, the first arm groove 114 and the second arm groove 124, 124B can be configured with a geometry that matches the geometry of at least a portion of the pin 50. For example, both the first arm groove 114 and the second arm groove (e.g., 124 and/or 124B) can have the same geometry as the head portion 51 of the pin 50 such that the head portion 51 fits securely within the corresponding grooves when the device 100 is in the closed position. Advantageously, when the pin 50 is clamped, clasped, secured, engaged, or grabbed by the first arm end portion 112 and the second arm end portion 122 either in direction A (e.g., parallel to the long axis of the device 100) or direction B (e.g., perpendicular to the long axis of the device 100, the pin 50 is firmly and securely gripped within the device 100. This enables the accurate placement and positioning of the pin 50 relative to the corresponding insertion point (e.g., a hole or bore in the surgical guide). Furthermore, use of the device 100 to apply the necessary force to insert the pin 50 into the corresponding insertion point enables the surgeon to avoid using his or her finger to press upon the head portion of the pin to insert the pin in the desired location. This reduces a significant amount of fatigue and discomfort to the surgeon's fingers during insertion of the pin. Furthermore, the secure engagement of the pin 50 by the device 100 provides controlled placement of the pin 50 and the reduced probability of the pin 50 accidentally dropping within the surrounding environment (e.g., a patient's mouth).

FIG. 6 illustrates a portion of the device (e.g. device 100 of FIGS. 1 and 2) including the first end of the first arm 110 and the first end of the second arm 120 in the open position prior to side-facing engagement with a pin 50 (e.g., engagement in direction B). As shown in FIG. 6, in an embodiment, the second arm end portion 122 can include a second arm side-facing groove 124B aligned in a second direction B. In an embodiment, the first arm groove 114 and the second arm side-facing groove 124B are configured to form an enclosure around at least a portion of the pin 50 to securely hold the pin 50 in place when the device 100 is in the closed position.

Figure 7:
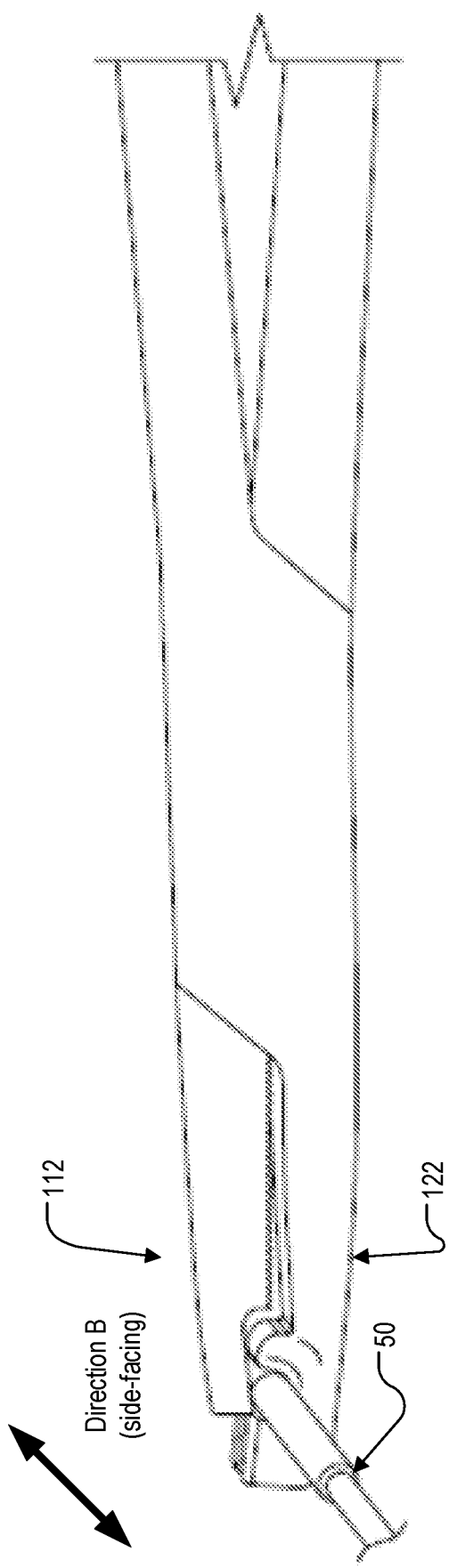
FIG. 7 illustrates a side view of a portion of the device in FIG. 6 in a closed position in engagement with a pin in a second direction, in accordance with one or more implementations

As shown in FIG. 7, a portion of pin 50 (e.g., a stem portion) extends out from the device 100 in direction B when the head portion of the pin 50 is secured or clamped within the respective grooves 114, 124B of the first arm end portion 112 and the second arm end portion 122 of the device 100 in the closed position.

FIG. 8 illustrates a cross-sectional view of the first arm end portion 112 and the second arm end portion 122 engaging and holding a head portion 51 of a pin 50, when the device is in the closed position. As shown in FIG. 8, a portion of the pin 50 traverses groove 124B to enable the head portion 51 to be positioned in secure engagement surrounded by portions of the first arm end portion 112 and the second arm end portion 122.

Figure 9A:
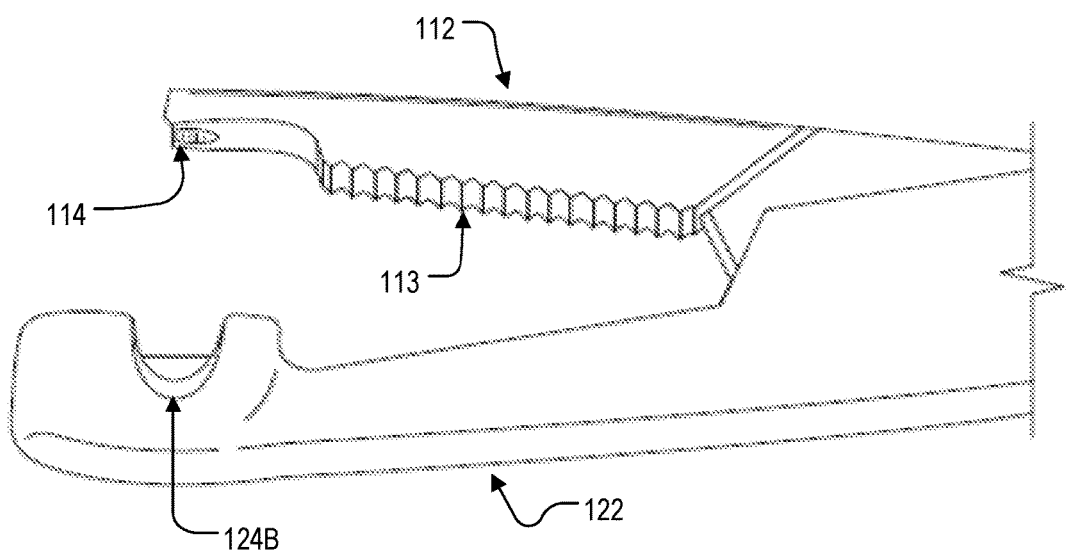
FIG. 9A illustrates a perspective side view of a portion of a device in an open position, in accordance with one or more implementations.
Figure 9B:
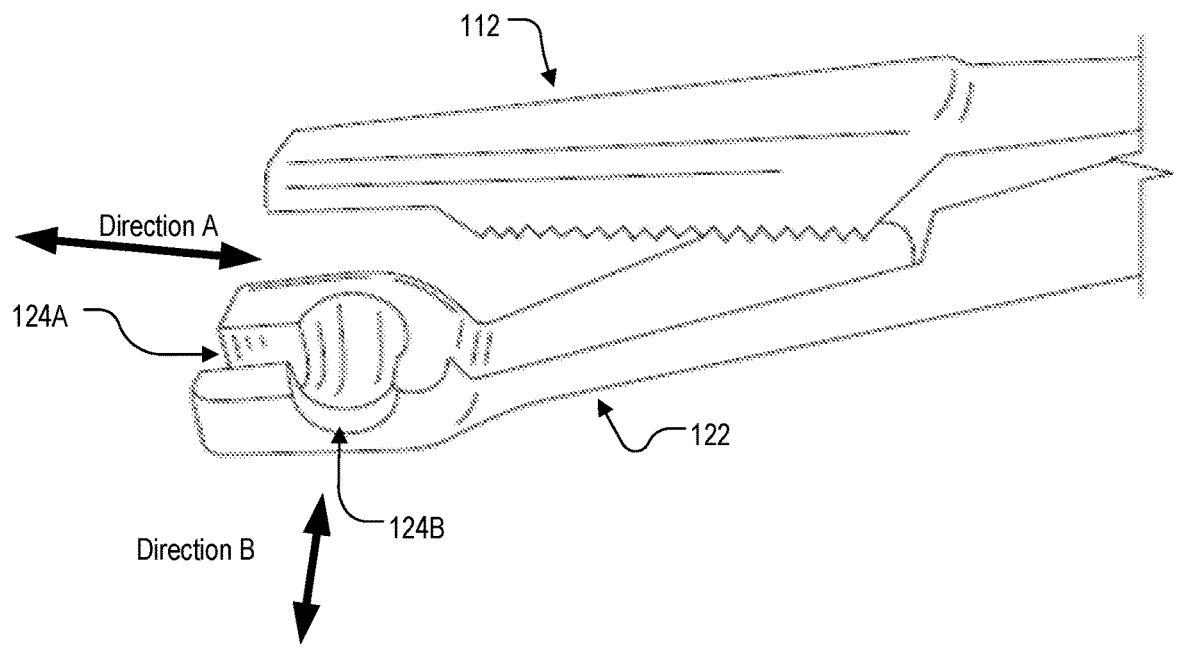
FIG. 9B illustrates a perspective side view of a portion of a device in an open position, in accordance with one or more implementations.

FIGS. 9A and 9B illustrate perspective views of a portion of the device including the first arm end portion 112 and the second arm end portion 122. As shown in FIG. 9A, the first arm end portion 112 can include a serrated surface 113 (e.g., a set of teeth or jagged portions) to come into contact with an opposing surface of the second arm end portion 122. In an embodiment, the serrated surface 113 provides for desired spacing of the first arm end portion 112 and the second arm end portion 122 when the device is in the closed position in engagement with the pin. As shown in FIG. 9A, a pin can be loaded into the device in either direction A or direction B such that the head portion of the pin is placed in contact with the first arm groove 114 of the first arm end portion 112. As shown in FIGS. 5A, 5B, and 9A, the first arm groove 114 can include a curved surface configured to correspond to a curved surface of the head portion of the pin.

FIG. 9B illustrates that the pin can be loaded into secure engagement within the device in either direction A (where the stem portion of the pin extends from the device using the channel formed by the front recess portion 124A of the second arm groove 124) or direction B (where the stem portion of the pin extends from the device using the channel formed by the side recess portion 124B of the second arm groove 124). Accordingly, greater flexibility is provided to the operator of the device to enable either front-facing or side-facing engagement of the pin. According to embodiments, depending on the surrounding environmental factors (e.g., space limitations, physical obstructions, visibility, location of the corresponding hole into which the pin is to be inserted), the operator of the device can elect to secure the pin in either the front-facing or side-facing direction. The multiple engagement options each provide the operator with secure engagement with the pin and flexibility in controlling and manipulating the device to produce sufficient force using the device to properly install the pin in the desired location.

Advantageously, the second groove 124 of the second arm end portion 122 includes both the first recess portion 124A and the second recess portion 124B. In an embodiment, the first recess portion 124A (also referred to as a "front recess portion 124A") enables secure engagement of the pin 50 such that the stem portion of the pin 50 extends in a first direction (e.g., direction A or the front-facing direction). In an embodiment, the second recess portion 124B (also referred to as a "side recess portion 124B") enables secure engagement of the pin 50 such that the stem portion of the pin 50 extends in a second direction (e.g., direction B or the side-facing direction). According to embodiments, when the device 100 is in the closed position securing the pin within the enclosure formed by the first arm end portion 112 and the second arm end portion 122, the first recess portion 124A is sized and shaped to provide a channel for the stem portion of the pin 50 to extend in direction A. According to embodiments, when the device 100 is in the closed position securing the pin within the enclosure formed by the first arm end portion 112 and the second arm end portion 122, the second recess portion 124B is sized and shaped to provide a channel for the stem portion of the pin 50 to extend in direction B.

Figure 10:
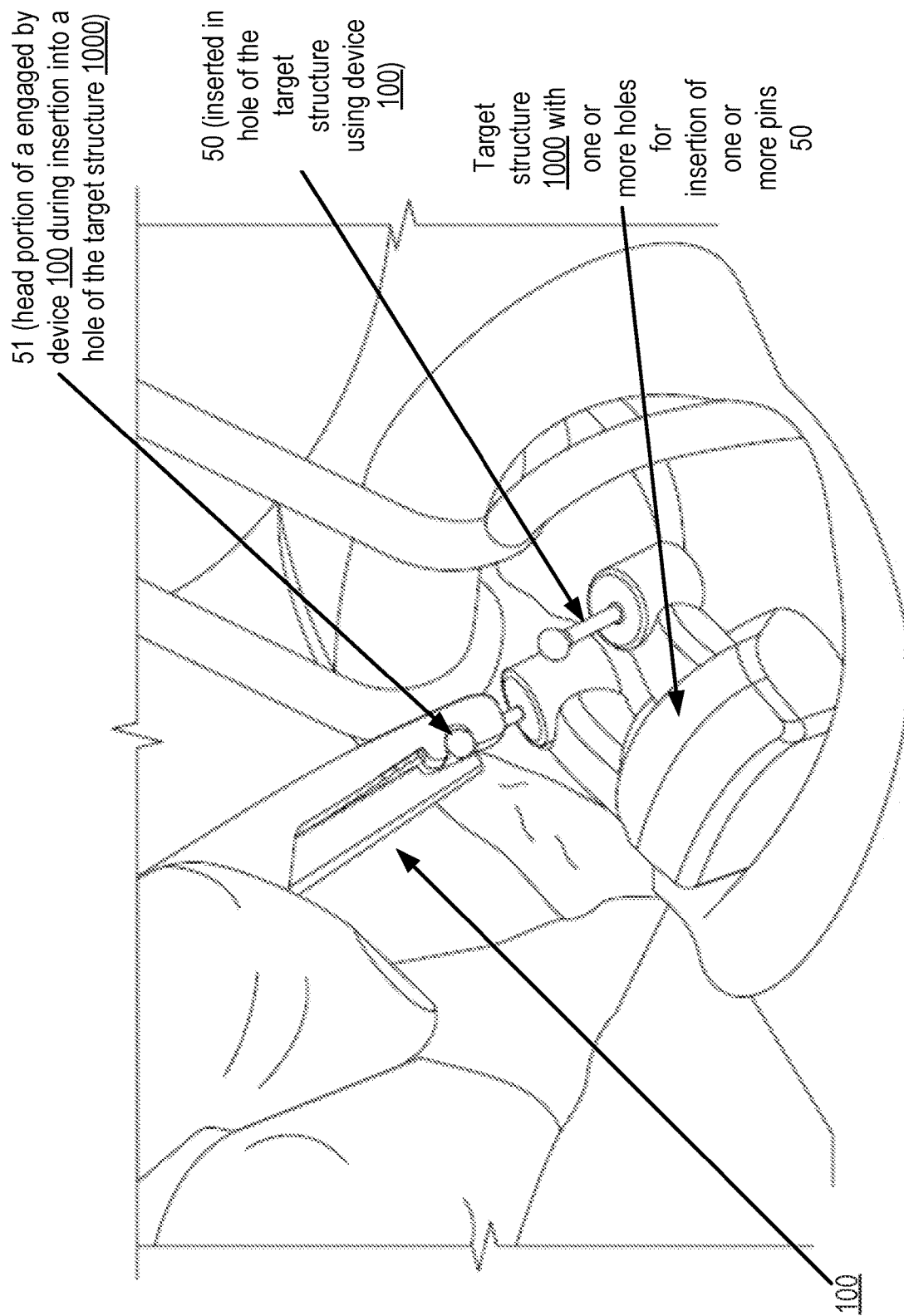
FIG. 10 illustrates a device in use to engage a pin for insertion within a hole of an example target structure during an example surgical procedure, in accordance with one or more implementations.

FIG. 10 illustrates the device 100 in operation for placement of one or more pins 50 during an example environment. As shown in FIG. 10, a target structure 1000 (e.g., a guided dental implant device) can include one or more holes or insertion points for insertion of the one or more pins 50. As shown in FIG. 10, the device 100 can securely engage and hold the pin 50 to enable a portion of the pin (e.g., a stem portion) to be inserted into the target structure 1000. Advantageously, the pin 50 is immobile when clamped within the device 100 in the closed position. The pin 50, held securely within the device 100, can be moved in a direction toward a corresponding hole of the target structure 1000 and installed therein. In an embodiment, the device 100 can be rotated in any manner suitable to place the pin 50 into the desired position.

Although FIG. 10 illustrates engagement with the pin 50 in the front-facing direction (direction A), it is to be appreciated that the pin 50 can be secured within the device 100 in the side-facing direction (direction B) at the discretion of the operator, based, for example, on factors associated with the environment surrounding the target structure 1000. In an embodiment, the secured engagement of the pin 50 by the device 100 renders the pin immobile. In this regard, operator can apply a force to the device 1000 to forcibly insert the stem portion of the pin 50 within the hole, without any undesired movement (e.g., rotation or side-to-side or up-and-down wiggling) of the pin 50.

In operation, once the pin 50 has been securely inserted within the hole of the target structure 1000, the operator can apply a force via the handle portions 116, 126 of the first arm 110 and the second arm 120, respectively to transition the device 100 from the closed and locked position (as shown in FIG. 10) and the open position. When in the open position, the pin is released from the secure engagement within the first arm end portion 112 and the second arm end portion 122.

In an embodiment, one or both of the first arm end portion 112 or the second arm end portion 122 can be removably attached such that the device 100 can include multiple different first arm end portions 112 and multiple different second arm end portions 114 each having different sized and shaped first arm grooves 114 and second arm grooves 124, 124B to accommodate different sized and shaped pins.

In an embodiment, the device 100 may include one or more removable and interchangeable sleeve portions (e.g., rubber or silicone sleeves) configured to attach to one of the first arm end portion 112 or the second arm end portion 114 to alter or change the size and/or shape of either the first arm groove 114 or second arm groove 124, 124B to accommodate engagement with different sized and/or shaped pins. For example, the device 100 without a sleeve portion (e.g., as shown in FIGS. 1-10) can be used with a pin 50 having a first size. In this example, a first sleeve portion can be added to the second arm end portion 114 such that the size of the recess formed by the second end groove 124A, 124B is reduced to securely engage and hold a pin having a smaller head portion than the head portion of pin 50.

The foregoing disclosure of the exemplary embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure.

Further, in describing representative embodiments, the specification may have presented aspects of the operation of the exemplary device as a particular sequence of steps. However, to the extent that the methods or processes do not rely on the particular order of steps set forth herein, the methods or processes should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the figures and are herein described in detail. It should be understood, however, that the invention is not to be limited to the particular forms or methods disclosed, but to the contrary, the invention is to cover all modifications, equivalents and alternatives falling within the scope of the appended claims.

What is claimed is:

1. A device comprising:
   a first arm comprising a first arm end portion comprising a first groove comprising a first curved surface; and
   a second arm coupled to the first arm, the second arm comprising a second arm end portion comprising a second groove comprising a first curved recess portion, a second curved recess portion, and a curved side surface extending to a top surface of the second arm end portion and extending between the first curved recess portion and the second curved recess portion,
   wherein the device is configured to transition between an open position and a closed position; and wherein, in the closed position, the first curved surface of the first groove of the first arm end portion corresponds to the first curved recess portion of the second groove and the curved side surface of the second arm end portion to form an enclosure adapted to securely engage a portion of a pin with a stem portion of the pin extending in a front-facing direction; and wherein, in the closed position, the first curved surface corresponds to the second curved recess portion of the second groove and the curved side surface of the second arm end portion to form the enclosure adapted to securely engage the portion of the pin with the stem portion of the pin extending in a side-facing direction.

2. The device of claim 1, wherein the first arm further comprises a first intermediate portion extending between the first arm end portion at a first end of the first arm and a first handle portion.

3. The device of claim 2, wherein the second arm further comprises a second intermediate portion extending between the second arm end portion at a first end of the second arm and a second handle portion.

4. The device of claim 3, wherein the device is transitioned between the open position and the closed position by applying a force to one or more of the first handle portion and the second handle portion.

5. The device of claim 4, wherein the first intermediate portion comprises a first locking portion and the second intermediate portion comprises a second locking portion, wherein the first locking portion and the second locking portion engage to lock the device in the closed position.

6. The device of claim 1, wherein the enclosure is adapted to securely engage a head portion of the pin.

7. The device of claim 1, further comprising a coupling element to rotatably couple the first arm and the second arm, wherein rotation of the first arm and the second arm about the coupling element transitions the device between the open position and the closed position.

8. The device of claim 1, wherein the portion of the pin is received in contact with the first curved recess portion of the second groove of the second arm end portion when the device is in the open position.

9. The device of claim 1, wherein the portion of the pin is received in contact with the second curved recess portion of the second groove of the second arm end portion when the device is in the open position.

10. A device comprising:
a first arm comprising a first arm end portion comprising a first groove; and
a second arm coupled to the first arm, the second arm comprising a second arm end portion comprising a second groove comprising a first curved recess portion, a second curved recess portion, and a curved side surface extending to a top surface of the second arm end portion and extending between the first curved recess portion and the second curved recess portion,
wherein the device is configured to transition between an open position and a closed position, and wherein, in the closed position, the first groove of the first arm end portion, the curved side surface, and the first curved recess portion form an enclosure to engage a head portion of a pin with a stem portion extending in a first direction relative to the device, and wherein, in the closed position, the first groove of the first arm end portion, the curved side surface, and the second curved recess portion form the enclosure to engage the head portion of the pin with the stem portion extending in a second direction relative to the device.

11. The device of claim 10, wherein the first curved recess portion of the second groove provides a channel for the stem portion of the pin extending in the first direction relative to the device.

12. The device of claim 11, wherein the second curved recess portion of the second groove provides a channel for the stem portion of the pin extending in the second direction relative to the device.

13. The device of claim 11, further comprising a coupling element to rotatably couple the first arm and the second arm.

14. The device of claim 13, wherein rotation of the first arm and the second arm about the coupling element transitions the device between the open position and the closed position.

15. The device of claim 11, wherein the head portion of the pin is received in contact with the first curved recess portion when the device is in the open position.

16. The device of claim 10, wherein the head portion of the pin is received in contact with the second curved recess portion of the second groove of the second arm end portion when the device is in the open position.

17. The device of claim 10, wherein the device in the closed position is operable to insert the stem portion of the pin into a hole of a target structure.

* * * * *